United States Patent [19]

Wirth et al.

[11] Patent Number: 5,092,359

[45] Date of Patent: Mar. 3, 1992

[54] HANDLE ENCLOSURE FOR VALVES

[75] Inventors: Gary J. Wirth, Milwaukee; Thomas J. Felmer, Brown Deer, both of Wis.

[73] Assignee: W. H. Brady Co., Milwaukee, Wis.

[21] Appl. No.: 679,384

[22] Filed: Apr. 2, 1991

[51] Int. Cl.⁵ ............................................. F16K 35/10
[52] U.S. Cl. ..................................... 137/382; 137/383
[58] Field of Search ..................... 137/382, 382.5, 383, 137/377; 220/85 P, 4.24, 4.22

[56] References Cited

U.S. PATENT DOCUMENTS

| | | |
|---|---|---|
| 280,912 | 7/1883 | Connolly . |
| 725,260 | 4/1903 | Speer . |
| 1,948,966 | 2/1934 | Jaeger .............................. 220/85 P |
| 2,838,064 | 6/1958 | Shieberl ................................ 137/282 |
| 3,980,099 | 9/1976 | Youngblood . |
| 3,982,681 | 9/1976 | Graves .......................... 220/4.24 X |
| 4,254,888 | 3/1981 | Chandler ......................... 220/85 P |
| 4,301,828 | 11/1981 | Martin ............................ 137/382 X |
| 4,405,161 | 9/1983 | Young ............................. 137/382 X |
| 4,457,445 | 7/1984 | Hanks ................................ 220/85 P |
| 4,516,414 | 5/1985 | Woolvin . |

Primary Examiner—Alan Cohan
Attorney, Agent, or Firm—Quarles & Brady

[57] ABSTRACT

An enclosure for a valve handle formed of two enclosure-halfs of identical structure hinged together to form a clamshell enclosure for the handle of the valve.

2 Claims, 2 Drawing Sheets

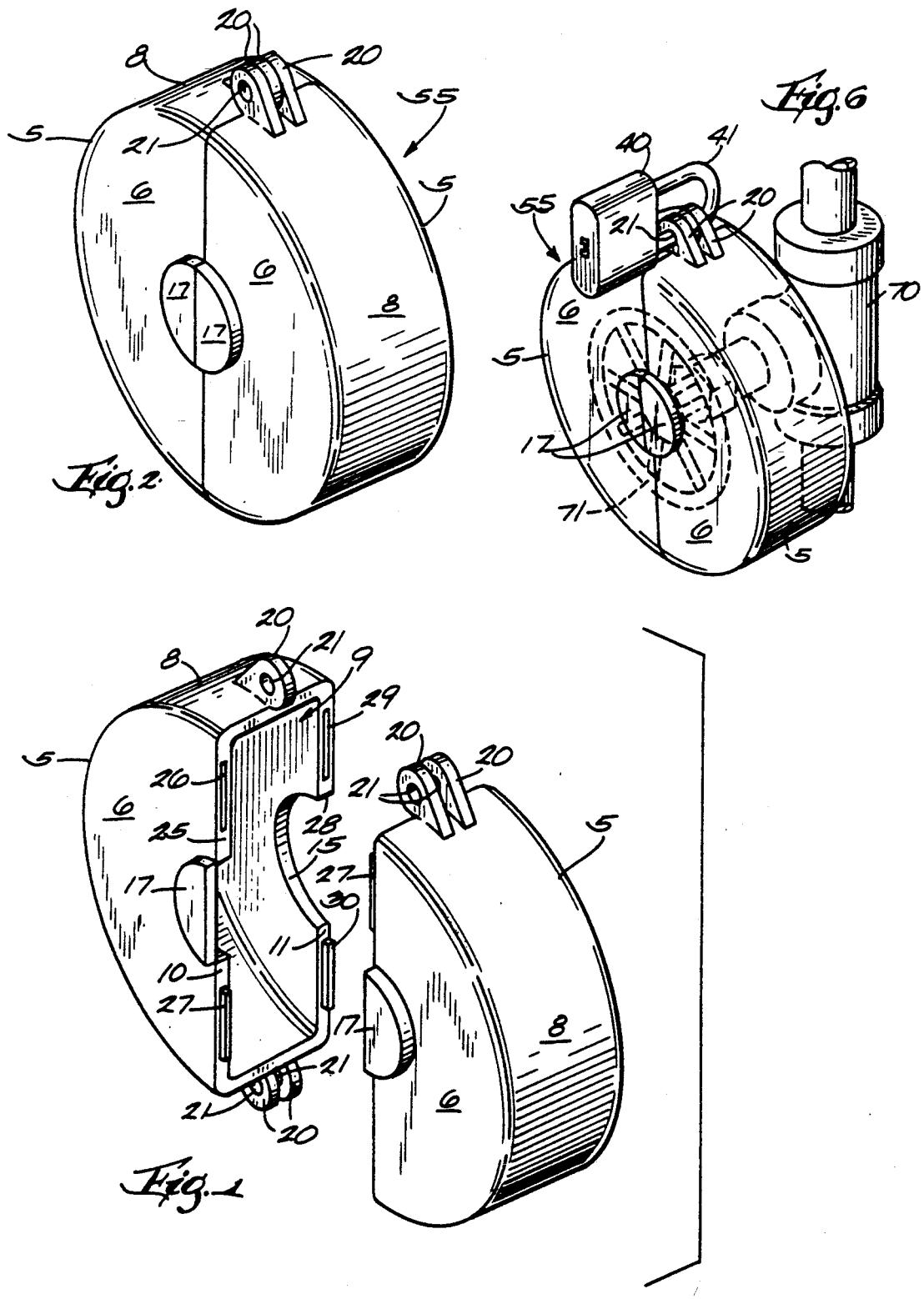

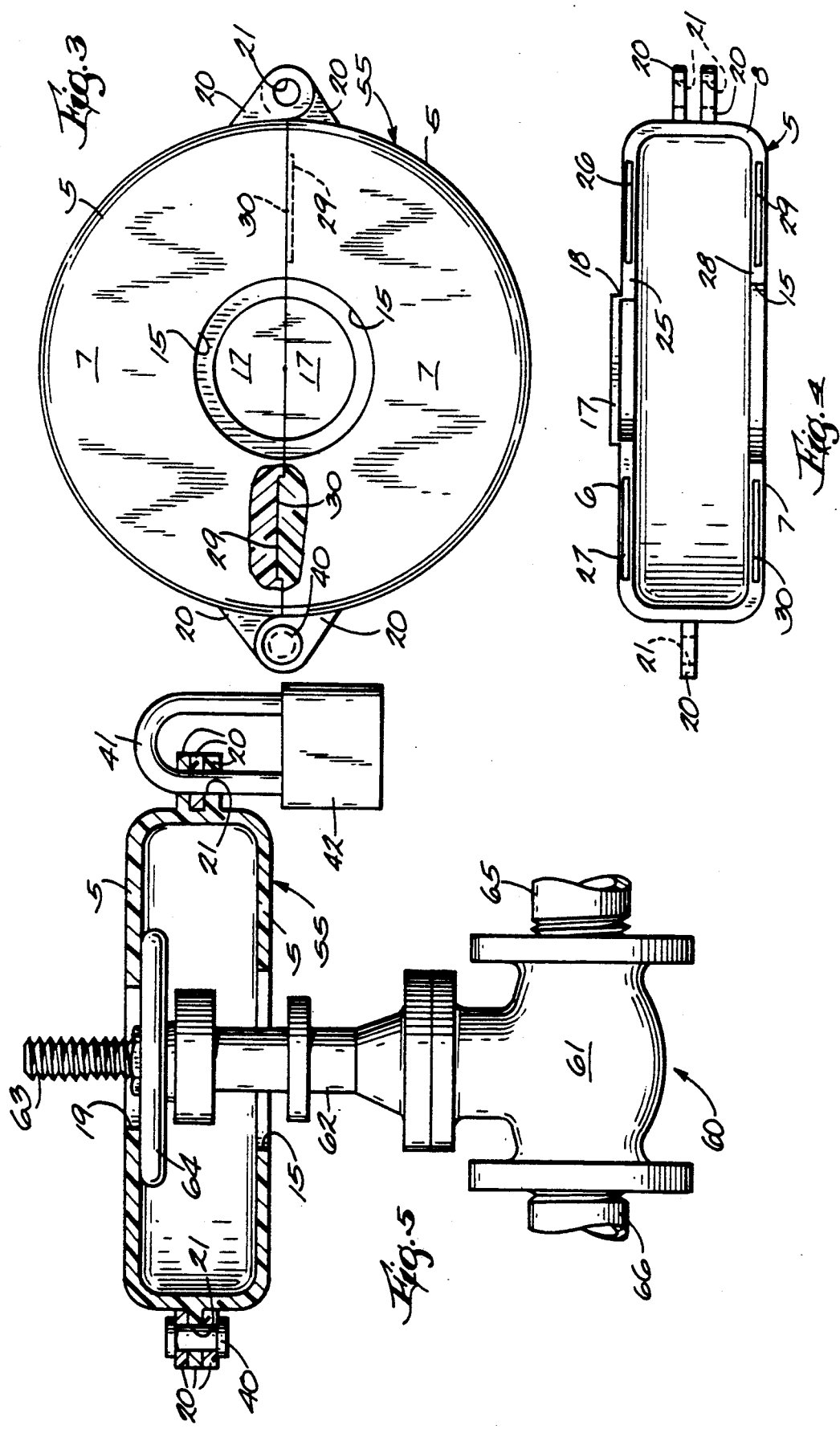

HANDLE ENCLOSURE FOR VALVES

FIELD OF THE INVENTION

The present invention relates to the field of devices which are intended to preclude unauthorized operation of a valve; more specifically, the present invention relates to an enclosure for a valve handle intended to prevent operation of the valve until the enclosure is removed at the time further actuation is desired.

BACKGROUND OF THE INVENTION

Valves can be actuated with various types of rotatable handles, such as a round handle, T-shaped handle or a handle with several spokes, to an open position, closed position or a throttled position between open and closed as selected to control the flow of materials through a pipeline. A valve sometimes must be maintained in a fully open position in order to achieve the desired flow through a pipeline. Also, a valve often must be adjusted to a throttled position (i.e. between open and closed) in order to achieve a selected rate of flow of materials through a pipeline. Further, however, it may be necessary to maintain a valve in a fully closed position so as to stop the flow of materials through a pipeline. An example of the latter case is the need to fluid carried in a pipeline such as a hydraulic line or compressed air line when maintenance or service work is to be performed. Each of these situations presents a need for a device that can be employed to assist in maintaining the rotatable handle of a valve in a selected position, and it would be desirable that any such device be capable of accommodating a valve handle in either an open, closed or throttled position.

In addition, it also would be desirable for any device of the foregoing type to include provision for accepting a lock so that the valve handle would be actuated to a changed position only upon appropriate authorization. For example, the Occupational Safety and Health Administration (OSHA) standard relating to safety requirements for the control of hazardous energy, 29 CFR §1910.147, entitled Control of Hazardous Energy Sources (Lockout/Tagout), establishes procedures to disable machinery or equipment and prevent the release of potentially hazardous energy while maintenance and servicing activities are performed. The standard requires, inter alia, that an energy source having a line valve that is capable of being locked out must be locked out to insure that equipment being controlled cannot be operated until the lockout is removed. A lockout is defined in the regulation as a positive means such as a lock to hold an energy isolating device in the safe position and prevent energizing of machinery or equipment. The regulation is applicable to any source of electrical, mechanical, hydraulic, pneumatic, chemical, thermal or other energy. The above OSHA regulation will now require, for example, that a valve installed on a pipeline carrying an energy source to machinery or equipment must include some form of device so that the valve can be locked in the closed position during maintenance or service.

Further, there is a need for a device of the foregoing type that can be retrofitted to existing valves so as to obviate the expense of replacing the many valves now in service with new valves that may include a builtin feature capable of maintaining a valve handle in one or more positions.

Guards for valve handles are described in the following U.S. patents:
280,912, Connolly, July 10, 1883;
725,260, Speer, Apr. 14, 1903;
3,980,099, Youngblood, Sept. 14, 1976; and
4,516,414, Woolvin, May 14, 1985.

In addition, to the devices proposed by the patents, a valve guard has been sold by the assignee of this patent and other companies for use with valves having rotatable handles consisting of two molded plastic elements, each of a different structure, that are joined together by integral molded hinge elements. Our present invention relates to an improved guard for a valve handle that has utilitarian advantages not attainable by the above prior art devices.

SUMMARY OF THE INVENTION

The present invention provides an enclosure for a valve handle comprising two semicircular hollow shell elements of identical construction which, when joined together, form a hinged enclosure for the handle of the valve that can be locked to restrict access to the handle. In addition, the two elements include structure to enable the enclosure to accommodate a valve of the type having a valve stem that extends through the handle.

DESCRIPTION OF THE DRAWINGS

The invention is described below in full and complete detail to enable its practice by those of ordinary skill in the art by reference to the following drawings.

FIG. 1 is an exploded perspective view illustrating an enclosure for a valve handle of the present invention.

FIG. 2 is a perspective view of the enclosure of FIG. 1 showing the two elements joined together.

FIG. 3 is a plan view illustrating the bottom wall of the enclosure.

FIG. 4 is a plan view of the open side of each element of the enclosure.

FIG. 5 is a side view, with portions broken away, illustrating the enclosure installed about the handle of a valve of the type having a valve stem that extends through the handle.

FIG. 6 is a perspective view illustrating the enclosure of the invention enclosing the handle of a second type of valve construction.

DESCRIPTION OF PRESENTLY-PREFERRED EMBODIMENTS

FIGS. 1-4 illustrate the two enclosure-halfs 5,5 of a valve handle enclosure of the present invention. The enclosure-halfs 5,5 are both of exactly the same construction, each of them having all of the same structural elements so that the description of one is equally applicable to the other.

Each enclosure-half 5 consists of a semicircular top wall 6, a semicircular bottom wall 7 spaced from the top wall, and a side wall 8 that connects the top wall and bottom wall about their outer curved perimeter. This provides an enclosure-half comprising a hollow shell having a closed semicircular side formed by side wall 8 and an open side 9 along the straight diametral edges 10 and 11 of the top wall 6 and bottom wall 7, respectively.

A semicircular opening 15 is defined in bottom wall 7, centered along edge 11 of the bottom wall. The openings 15 of the two enclosure-halfs 5,5 will combine to form a circular opening that surrounds a valve stem when the two halfs are joined together as described later in this specification.

A semicircular knockout element 17 is formed along top wall 6, centered along edge 10 of the top wall. As best seen in FIG. 4, knockout element 17 is offset from the plane of top wall 6 and connected to the top wall by a thin web 18 extending around the edge of element 17. The knockout elements 17 of the enclosure-halfs 5,5 can be removed from each enclosure-half to form a circular opening in the top wall for the purpose described later in this specification. The knockout elements also can be defined by a groove in the top wall to be coplanar with the top wall, and can be offset above (as illustrated) or below the plane of the top wall.

A single panel 20 extends from side wall 8 of each enclosure-half 5 along one end of open side 9 thereof. Panel 20 includes a central aperture 21. Panel 20 is located along the centerline (between top wall 6 and bottom wall 7) of side wall 8. At the opposite end of open side 9, two spaced panels 20 extend from side wall 8. The two panels 20 at this end of the open side each have an aperture 21, the two apertures being aligned with each other. The two panels 20 are spaced apart a distance equal to or slightly greater than the thickness of the single panel 20 at the opposite end of the side wall 8, and are located equidistant from the centerline of side wall 8. As best seen in FIG. 3, the panels 20 each have a portion that extends beyond edges 10 and 11 of the top wall and bottom wall and the apertures 21 that are formed in the panels 20 are centered along the edges 10 and 11 of the top and bottom walls of each enclosurehalf 5.

The end surface 25 of top wall 6 along the open side of enclosure-half 5 is formed with a slot 26 recessed therein on one side of knockout element 17 and a tab 27 on the opposite side of knockout element 17 that projects from end wall 25. Similarly, end wall 28 of bottom wall 7 includes a slot 29 recessed therein along one side of opening 15 and a tab 30 that projects from end wall 28 on the opposite side of opening 15. Recesses 26 and 29 are aligned with each other, and tabs 27 and 30 are aligned with each other.

The enclosure-halfs 5,5 are molded of suitable plastic material so that each of their component elements, walls 6, 7, 8, knockout elements 17, panels 20 and tabs 27 and 30, are formed as integral elements of a one piece unit along with apertures 15 and slots 26 and 29. Suitable plastics include, for example, polyethylenes such as medium and high density polyethylene, polypropylenes and nylons, although other resins can be employed. The plastic selected for the enclosure-halfs should be capable of withstanding a suitable range of ambient temperatures and exhibit chemical resistance appropriate for valves located in various environments, both indoors and outdoors. The enclosure-halfs can be formed by injection molding, and one of the useful advantages of the enclosure-half construction shown in the drawings is that they can be made with relatively inexpensive molds and the molds can be easily parted. The enclosure-halfs can be made in several sizes, each intended to be used with a range of valve handle sizes. Thus, for example, enclosure-halfs 5 with an interior space of 2.5 inches to 8.5 inches in diameter and about 1 to 2 inches high can be made that will enable enclosing the handles of most sizes of valves.

Two enclosure-halfs 5,5 are joined together in order to form an enclosure 55 of the present invention, as illustrated in perspective in FIG. 2 and plan view in FIG. 3. This is accomplished by interleaving the single panel 20 at one end of one enclosure-half 5 between the two spaced panels 20 at the opposite end of the other enclosure-half 5 so that apertures 21 extending through the interleaved three panels will be aligned with one another, following which a hinge pin 40 is inserted between the three aligned apertures 21 so as to join the two enclosure-halfs together. The hinge pin 40 preferably is a rivet construction so as to provide a tamper-proof hinge connection between the two enclosurehalfs. Also, however, other type of hinge pin constructions can be employed. After being joined by a hinge pin in this fashion, it will be noted from FIG. 3 that the tabs 27 and 30 extending from end walls 10 and 11 of one enclosure-half 5 are received in the slots 26 and 29 of the other enclosure-half that are registered with the tabs when the two enclosure-halfs are closed. This arrangement serves to impart additional structural rigidity to the enclosure 55. As also shown in FIG. 3, which is a plan view of the bottom of enclosure 55, the semicircular openings 15 in each enclosure-half 5 combine to form a circular opening that will extend about a valve stem as described later in this specification. Turning to FIG. 2, the knockout elements 17 of each enclosure half 5 form a centrally located circular knockout member. The knockout elements 17 each can be separated from the enclosure-halfs 5,5 either manually or with a tool such as a pair of pliers when it is desired to include an opening along the top wall of enclosure 55. At the side of enclosure 55 opposite from the panels 20 joined together by hinge pin 40, the single panel 20 of one enclosure-half is interleaved between the two spaced panels 20 of the other enclosure-half, and the openings 21 of the three panels 20 are aligned with one another so as to receive the hasp of a lock.

FIG. 5 illustrates a rising stem type of valve 60 that includes a valve body 61 having an internal flowway (not shown), a yoke structure 62 attached to the valve body, a threaded valve stem 63 that can be moved up and down through the yoke structure, and a handwheel 64 secured to the upper end of yoke structure 62 which is rotated manually to raise and lower valve stem 63 to open, close and throttle the valve. It can be seen that valve 60 is the type of valve that includes a valve stem which extends beyond the handwheel, or round handle, 64. Pipe 65 is connected to one end of valve body 61 and pipe 66 to the other end so that the valve can be used to control the flow of fluid through pipes 65 and 66.

FIG. 5 also illustrates enclosure 55 installed on valve 60 so as to prevent unauthorized access to handwheel 64 of the valve. Enclosure 55 is inserted about handwheel 64 of valve 60 by hinging the two enclosure-halfs 5,5 open about hinge pin 40. Knockout elements 17 are removed from the top wall 6 from each enclosure-half. Enclosure 55 is then closed with the single panel 20 along one side of one enclosure-half interleaved with the two spaced panels 20 of the other enclosure-half along the side of the enclosure opposite from hinge pin 40. In this condition, the apertures 15 of the two enclosure-halfs form a circular aperture that surrounds yoke structure 62 of valve 60. Removal of the knockout elements 17 from the top wall of each enclosurehalf forms an opening 19 located centrally of the top of enclosure 55 that surrounds the portion of valve stem 63 which extends above handwheel 64 of the valve. The hasp 41 of a lock 42 is inserted through the aligned openings 21 of the three panels 20 along one side of the enclosure 55, following which the hasp is locked to preclude unauthorized removal of enclosure 55. The enclosure 55 according to the present invention thereby provides for restricting persons from actuating the valve 60 except when authorized. It should be noted that the handwheel 64 can be in an open position, closed position or a throttled position between open and closed when enclosure 55 is placed about the handwheel and locked, to thereby maintain the valve in the position selected by the operator until a change is authorized.

Enclosure 55 also can be used with a valve having a handle in which the valve stem does not extend beyond the handle. This is illustrated in FIG. 6 by valve 70 having a round handle 71 secured to a valve stem. With this type of installation, the knockout elements 17 of the two enclosure-halfs 5 are left in position on the top wall of each of the two enclosure-halfs. This provides an enclosure 55 with a continuous top wall that covers the outermost surface of handle 71. As described above, valve 70 can be open, closed or throttled between open and closed when enclosure 55 is positioned about handle 71 and locked.

In the foregoing description, it can be seen that the present invention provides a clamshell type of enclosure suitable for enclosing and restricting access to the handle of a valve. The valve may be a gate valve, a ball valve or any suitable type. The new enclosure is formed of two molded plastic enclosure-halfs that are of identical construction. This results in an enclosure for a valve handle which is effective for its intended purpose and yet which can be molded of plastic with reduced tooling and molding costs as compared to other plastic valve guards meant for the same purpose. This also has a beneficial effect of reducing the parts inventory required by a manufacturer of the enclosures. The provision of the knockout element structure on each enclosure-half as described above lends additional utility to the device of the present invention in that it is capable of being used with several types of valves, i.e. valves with a valve stem that extends beyond the handle and valves having a handle attached to the end of a valve stem. This is beneficial to the end user in that a single enclosure structure can accommodate both styles of valves, thereby reducing the end user's inventory requirements and providing additional flexibility of use.

The foregoing detailed description is made by reference to a specific embodiment of a valve handle enclosure according to the present invention as an illustrative, not limiting disclosure and it is anticipated that those of ordinary skill in the art will be able to devise modifications to the described embodiment that will remain within the true spirit and scope of the present invention.

We claim
1. An enclosure for the handle of a valve characterized in that:
  (1) the enclosure consists of first and second enclosure-halfs that are of identical construction;
  (2) each enclosure-half comprising a hollow semicircular shell including a top wall, bottom wall spaced from the top wall, and a side wall between the periphery of the top and bottom walls to provide a shell with a curved closed side and a diametral open side, each closure-half also including
    (a) a semicircular aperture located centrally of the bottom wall along the open side of the enclosure half,
    (b) a single panel extending from the side wall along a first end of the open side of the enclosure-half, and an aperture in the panel,
    (c) a pair of spaced panels extending from the side wall along a second end of the open side thereof opposite from the first end, and an aperture in both of the spaced panels, and
  (3) the single panel of the first enclosure-half is interleaved between the pair of spaced panels of the second enclosure-half and a hinge pin extends through aligned apertures of the panels to join the two enclosure-halfs together;
  (4) the single panel of the second enclosure-half is interleaved between the pair of spaced panels of the first enclosure-half and aligned apertures of the panels are positioned to receive the hasp of a lock; and
  (5) each enclosure-half includes a knockout element located centrally of the top wall along the open side of each enclosure-half, the knockout elements are removeable from each enclosure-half to provide an opening along the top wall of the enclosure for passage of a valve stem extending beyond the handle of a valve.

2. An enclosure according to claim 1 further characterized in that:
  the knockout element of the enclosure-halfs is an element offset from the plane of the top wall and connected to the top wall by a separable web.

* * * * *